United States Patent
Lee et al.

(10) Patent No.: US 9,876,712 B2
(45) Date of Patent: Jan. 23, 2018

(54) METHOD AND DEVICE FOR PROCESSING ADDRESS RESOLUTION PROTOCOL IN SOFTWARE-DEFINED NETWORKING ENVIRONMENT

(71) Applicant: KT Corporation, Seongnam-si (KR)

(72) Inventors: Se Hui Lee, Daejeon (KR); Jeong Wook Lee, Daejeon (KR); Tae Jin Ahn, Daejeon (KR); Woo Tae Kim, Daejeon (KR)

(73) Assignee: KT Corporation, Seongnam-si (KR)

( * ) Notice: Subject to any disclaimer, the term of this patent is extended or adjusted under 35 U.S.C. 154(b) by 153 days.

(21) Appl. No.: 14/845,539

(22) Filed: Sep. 4, 2015

(65) Prior Publication Data

US 2016/0072705 A1    Mar. 10, 2016

(30) Foreign Application Priority Data

Sep. 5, 2014  (KR) .................. 10-2014-0119237
Aug. 25, 2015 (KR) .................. 10-2015-0119408

(51) Int. Cl.
*H04L 12/70* (2013.01)
*H04L 12/741* (2013.01)
*H04L 12/721* (2013.01)
*H04L 29/12* (2006.01)

(52) U.S. Cl.
CPC ............ *H04L 45/38* (2013.01); *H04L 61/103* (2013.01); *H04L 61/6013* (2013.01); *H04L 61/6022* (2013.01); *H04L 45/74* (2013.01)

(58) Field of Classification Search
CPC .............. H04L 61/103; H04L 61/6013; H04L 61/6022
See application file for complete search history.

(56) References Cited

U.S. PATENT DOCUMENTS

| | | | | |
|---|---|---|---|---|
| 7,174,376 B1* | 2/2007 | Daruwalla | ......... | H04L 12/2801 370/350 |
| 2005/0083854 A1* | 4/2005 | Nagarajrao | ............ | H04L 12/24 370/254 |
| 2010/0054253 A1* | 3/2010 | Li | ..................... | H04L 29/12028 370/392 |
| 2013/0070762 A1* | 3/2013 | Adams | .................... | H04L 49/70 370/389 |
| 2013/0279371 A1* | 10/2013 | Takashima | ............. | H04L 45/38 370/254 |
| 2014/0019639 A1* | 1/2014 | Ueno | .................... | H04L 61/103 709/238 |
| 2014/0064148 A1* | 3/2014 | Jain | ........................ | H04L 12/28 370/255 |
| 2015/0117256 A1* | 4/2015 | Sabaa | .................... | H04L 49/15 370/254 |

\* cited by examiner

*Primary Examiner* — Scott M Sciacca
(74) *Attorney, Agent, or Firm* — Sughrue Mion, PLLC

(57) ABSTRACT

A method and device for processing an address resolution protocol (ARP) in a software-defined networking (SDN) environment is disclosed. The method includes receiving, by a first network device, an ARP request packet from a first terminal so that the first terminal communicates with a second terminal and transmitting, by the first network device, an ARP response message including MAC address information of the second terminal to the first terminal as a response to the ARP request packet. Accordingly, a load of the controller can be reduced by sharing and processing an ARP proxy function with the network device in the SDN environment.

16 Claims, 5 Drawing Sheets

METHOD AND DEVICE FOR PROCESSING ADDRESS RESOLUTION PROTOCOL IN SOFTWARE-DEFINED NETWORKING ENVIRONMENT

CLAIM FOR PRIORITY

This application claims priority to Korean Patent Application Nos. 10-2014-0119237 filed on Sep. 5, 2014, 10-2015-0119408 filed on Aug. 25, 2015 in the Korean Intellectual Property Office (KIPO), the entire contents of which are hereby incorporated by reference.

BACKGROUND

1. Technical Field

Example embodiments of the inventive concept relate in general to software-defined networking (SDN), and more particularly, to a method and device for processing an address resolution protocol (ARP) in an SDN environment.

2. Related Art

Software-defined networking (SDN) means a user-oriented network in which a user has control authority regardless of a basic network device such as a router or a switch, etc. and a separate software controller controls a flow of traffic.

OpenFlow is one variety of SDN technology and defines an interface connecting a hardware such as a router and a controller operating in a network operating system (OS), and is a protocol for separating a control plane for controlling how to transmit a data packet through a network from a physical network and interacting with a data plane for data transmission.

The router to which an OpenFlow function is applied is defined as a matching and an operation of a flow table to layer 2 (L2) switching, layer 3 (L3) routing, an access control list (ACL), a quality of service (QOS), etc. The router does not have a function of processing autonomously even in the case of the L2 switching and an address resolution protocol (ARP), and a concept of receiving the flow table from the controller and processing the ARP is not clear.

Meanwhile, a terminal connected to the router has to know a media access control (MAC) address of a server which is a communication target or another terminal in order to perform internet protocol (IP)-based communication. That is, the terminal performs bidirectional communication with the server which is the communication target or another terminal by adding a destination address to the IP packet.

In order to know the MAC address of the server which is the communication target or another terminal, when the terminal makes an ARP request in a broadcast manner, all terminals in a network composed of the same subnet receive the ARP request. A terminal which has the IP address corresponding to the ARP request performs an ARP response by loading its own MAC address, and the terminal which transmits the ARP request receives the ARP response and generates an ARP table, and thus bidirectional communication can be performed.

In the SDN environment, the ARP response should be processed according to a path which is set by the controller with respect to the ARP request of a lower layer terminal connected to the router, but a definition with respect to this process is not clear. Further, there is a problem in which the ARP request packets from every terminal connected to the router are always concentrated to a central controller and thus a load of the controller is increased.

Moreover, in the case of the terminal connected to the router supporting the SDN, there is no method of dynamically allocating an initial IP, and a basic gateway IP for routing is not set. Accordingly, there is a problem in which the router has no choice but to make the ARP request in the broadcast manner like in the same network, and cannot transmit the ARP request to a specific terminal in another network which cannot be reached in the broadcast manner.

SUMMARY

Accordingly, example embodiments of the inventive concept are provided to substantially obviate one or more problems due to limitations and disadvantages of the related art.

Example embodiments of the inventive concept provide a method of processing an address resolution protocol (ARP) by a controller performing an ARP proxy function in a software-defined networking (SDN) environment.

Example embodiments of the inventive concept also provide a method of processing the ARP by a network device performing the ARP proxy function in the SDN environment.

Example embodiments of the inventive concept further provide a method of processing the ARP by an interaction between the controller and the network device in the SDN environment.

In some example embodiments, a method of processing the ARP by the controller in the SDN environment, includes: receiving an ARP request packet from a network device so that a first terminal communicates with a second terminal and transmitting flow table information and a process command message for processing the ARP request packet to the network device and controlling the network device to perform a process command message according to a flow table updated based on the flow table information.

Here, the controlling of the network device to perform the process command message may control the network device to transmit an ARP response message to the first terminal according to the process command message.

Here, the ARP response message may include media access control (MAC) address information of the second terminal by the controller.

Here, the controlling of the network device to perform the process command message may broadcast the ARP request packet to a plurality of terminals connected to the network device according to the updated flow table, receive the ARP response message which is a response to the ARP request packet from the second terminal, and transmit the ARP response message to the first terminal.

Here, the ARP response message may include MAC address information of the second terminal by the second terminal.

In other example embodiments, a method of processing an ARP by a network device in an SDN environment, includes: receiving, by a first network device, an ARP request packet from the first terminal so that a first terminal communicates with a second terminal and transmitting, by the first network device, an ARP response message including MAC address information of the second terminal to the first terminal as a response to the ARP request packet.

Here, when the second terminal is connected to the first network device and the first network device has an ARP proxy function, the transmitting of the ARP response message to the first terminal may perform the ARP proxy function by including the MAC address information of the second terminal in the ARP response message by the first network device.

Here, when the second terminal is connected to a second network device located in a domain different from the first network device and the second network device has the ARP proxy function, the transmitting of the ARP response message to the first terminal may perform the ARP proxy function by including the MAC address information of the second terminal in the ARP response message by the first network device.

Here, when the second terminal is connected to a second network device located in a domain different from the first network device and the second network device has the ARP proxy function, the transmitting of the ARP response message to the first terminal may include transmitting, by the first network device, the ARP request packet to the second network device; transmitting, by the second network device, an ARP response message including MAC address information of the second terminal to the first network device as a response the ARP request packet; and transmitting, by the first network device, the ARP response message to the first terminal.

Here, the transmitting of the ARP response message to the first terminal may include transmitting the ARP request packet to a controller and receiving flow table information and a process command message for a process operation of the ARP request packet from the controller as a response to the ARP request packet.

Here, the transmitting of the ARP response message to the first terminal may further include updating a flow table based on the flow table information.

Here, the transmitting of the ARP response message to the first terminal may further include transmitting an ARP response message to the first terminal according to the updated flow table and the process command message.

Here, the ARP response message may include the MAC address information of the second terminal by the controller.

Here, the transmitting of the ARP response message to the first terminal may further include broadcasting the ARP request packet to a plurality of terminals according to the updated flow table and the process command message, and receiving an ARP response message which is a response to the ARP request packet from the second terminal, and transmitting the ARP response message to the first terminal.

Here, the ARP response message may include the MAC address information of the second terminal by the second terminal.

In still other example embodiments, a method of processing an ARP in an SDN environment, includes: inquiring, by a controller, whether a plurality of network devices have ability to perform the ARP proxy function to the plurality of network devices; receiving, by the controller, a response from each of the plurality of network devices whether each of the plurality of network devices has the ability to perform the ARP proxy function; and selecting, by the controller, the network device to perform the ARP proxy function based on the response of each of the plurality of network devices.

Here, the network device which is selected to perform the ARP proxy function may receive an ARP request packet from the first terminal so that the first terminal communicates with the second terminal, transmit an ARP response message including MAC address information of the second terminal to the first terminal, and perform the ARP proxy function.

Here, the network device which is not selected to perform the ARP proxy function may receive an ARP request packet from the first terminal so that the first terminal communicates with the second terminal, transmit the ARP request packet to the controller, receive an ARP response message which is a response to the ARP request packet from the controller, and transmit the ARP response message to the first terminal.

Here, the ARP response message may include MAC address information of the second terminal by the controller.

BRIEF DESCRIPTION OF DRAWINGS

Example embodiments of the inventive concept will become more apparent by describing in detail example embodiments of the inventive concept with reference to the accompanying drawings, in which.

DESCRIPTION OF EXAMPLE EMBODIMENTS

Figure 1:
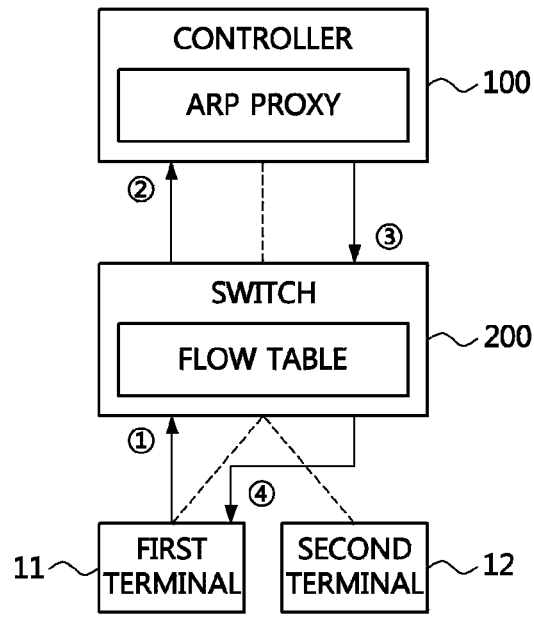
FIG. 1 is a diagram for describing a method in which a controller performs an address resolution protocol (ARP) proxy function in a software-defined networking (SDN) environment according to one embodiment of the inventive concept.

While the invention is susceptible to various modifications and alternative forms, specific embodiments thereof are shown by way of examples in the drawings and will herein be described in detail. It should be understood, however, that there is no intent to limit the invention to the particular forms disclosed, but on the contrary, the invention is meant to cover all modifications, equivalents, and alternatives falling within the spirit and scope of the invention. Like numbers refer to like elements in the accompanying drawings.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, it will be understood that when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a controller used in the inventive concept may be a unified software-defined networking (SDN) controller, and mean a function entity controlling relevant components (for example, a switch, a router, etc.) for controlling a flow of traffic.

Further, the controller may not be limited by physical implementation shape or position, etc. For example, the controller may mean a controller function entity defined in open networking foundation (ONF), Internet engineering task force (IETF), a European telecommunication standards institute (ETSI), and/or international telecommunication union-telecommunication (ITU-T), etc.

A network device used in the inventive concept may mean a function entity of actually forwarding, switching, or routing traffic (or a packet) such as a switch or a router. Accordingly, the network device in the inventive concept may be referred to as the switch or the router.

For example, the network device may mean the switch, the router, a switching element, a routing element, a forwarding element, etc. defined in the ONF, IETF, ETSI, and/or ITU-T, etc.

Hereinafter, a parameter and/or a message type defined in an operation for a method of processing an address resolution protocol (ARP) in an SDN environment according to an embodiment of the inventive concept is not limited to a specific message which will be described below.

Hereinafter, an embodiment of the inventive concept will be described in detail with reference to the accompanying drawings.

FIG. 1 is a diagram for describing a method in which a controller performs an ARP proxy function in a SDN environment according to one embodiment of the inventive concept.

An example in which a controller 100 performs the ARP proxy function and a switch 200 does not perform the ARP proxy function will be described with reference to FIG.

Accordingly, the controller 100 may include a function block performing the ARP proxy function, and the switch 200 may not include the function block performing the ARP proxy function and manage only a flow table. Here, the function block performing the ARP proxy function may be implemented as a separate module, or by providing an additional function to a module included in the controller 100.

In more detail, a first terminal 11 may broadcast an ARP request packet in order to find a media access control (MAC) address of a second terminal ①. The switch 200 receiving the ARP request packet may transmit a message for the ARP request packet to the controller 100 since there is not a corresponding flow in the flow table ②. Here, the message which the switch 200 transmits to the controller 100 may have a packet-in type according to an interaction protocol between the controller 100 and the switch 200. For example, a packet-in type message transmission method may only transmit a message header including a message ID to the controller 100 when there is a memory space available in the switch 200, and transmit the entire ARP request packet together with the packet-in type message to the controller 100 when there is no memory space available in the switch 200.

The controller 100 may transmit flow table information and a process command message for processing the ARP request packet to the switch 200 ③. For example, the controller 100 may transmit the flow table information for setting a routing path for the ARP request and response to the switch 200 in advance, and then, transmit the process command message defining the process operation for the ARP request packet to the switch 200. Here, the message which the controller 100 transmits to the switch 200 may have a packet-out type according to the interaction protocol between the controller 100 and the switch 200. Accordingly, the switch 200 may confirm the process operation by mapping the original packet-in type message with reference to the packet-out type message transmitted from the controller 100.

The switch 200 may generate or update the flow table using the flow table information transmitted from the controller 100, and then synchronize a time for processing a routing for the ARP request packet, and for this, a barrier command which is a protocol between the controller 100 and the switch 200 may be used for sequentially processing commands between the controller 100 and the switch 200.

The controller 100 may transmit a process command message including the ARP response message to the switch 200. That is, the controller 100 may transmit the ARP response message including a MAC address of a second terminal 12 to the switch 200 as a response to the ARP request packet since the controller 100 performs the ARP proxy function.

Accordingly, the switch 200 may transmit the ARP response message transmitted from the controller 100 to the first terminal 11 ④, and the first terminal 11 may perform mutual communication with the second terminal 12 using the MAC address of the second terminal 12 included in the ARP response message transmitted from the switch 200.

Figure 2:
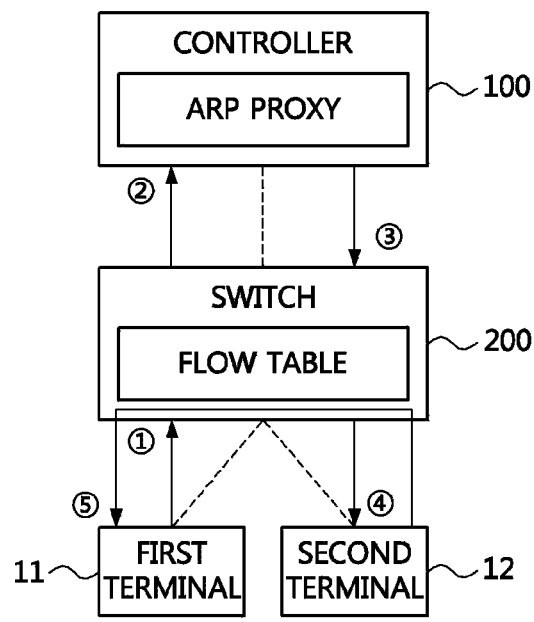
FIG. 2 is a diagram for describing a method in which a controller performs an ARP proxy function in an SDN environment according to another embodiment of the inventive concept.

FIG. 2 is a diagram for describing a method in which a controller performs an ARP proxy function in an SDN environment according to another embodiment of the inventive concept.

An example in which a controller 100 performs the ARP proxy function and a switch 200 does not perform the ARP proxy function will be described with reference to FIG. 2.

Accordingly, the controller 100 may include a function block performing the ARP proxy function, and the switch 200 may not include the function block performing the ARP proxy function and manage only a flow table. Here, the function block performing the ARP proxy function may be implemented as a separate module, or by providing an additional function to a module included in the controller 100.

In more detail, a first terminal 11 may broadcast an ARP request packet in order to find a MAC address of a second terminal 12 ①. The switch 200 receiving the ARP request packet may transmit a message for the ARP request packet to the controller 100 since there is not a corresponding flow in the flow table ②. Here, the message which the switch 200 transmits to the controller 100 may have a packet-in type according to an interaction protocol between the controller 100 and the switch 200. For example, a packet-in type message transmission method may only transmit a message header including a message ID to the controller 100 when there is a memory space available in the switch 200, and transmit the entire ARP request packet together with the packet-in type message to the controller 100 when there is no memory space available in the switch 200.

The controller 100 may transmit flow table information and a process command message for processing the ARP request packet to the switch 200 ③. For example, the controller 100 may transmit the flow table information for setting a routing path for the ARP request and response to the switch 200 in advance, and then transmit a process command message defining the process operation for the ARP request packet to the switch 200. Here, the message which the controller 100 transmits to the switch 200 may have a packet-out type according to the interaction protocol between the controller 100 and the switch 200. Accordingly, the switch 200 may confirm the process operation by mapping the original packet-in type message with reference to the packet-out type message transmitted from the controller 100.

The switch 200 may generate or update the flow table using the flow table information transmitted from the controller 100, and then synchronize a time for processing a routing for the ARP request packet, and for this, use a barrier command which is a protocol between the controller 100 and the switch 200 may be used for sequentially processing commands between the controller 100 and the switch 200 to.

The switch 200 may broadcast the ARP request packet to a plurality of terminals connected to the switch 200 according to the updated flow table and the process command message ④. For example, the broadcast of the ARP request in the switch 200 may be processed by specifying a broadcast port or an output port having a FLOOD function using a group table. That is, the switch 200 may broadcast the ARP request packet according to the flow table information defined by the controller 100. Accordingly, the ARP request packet which the switch 200 broadcasts may be received by every terminal connected to the switch 200 including the second terminal 12.

The second terminal 12 may respond to the ARP request packet with a unicast. That is, the switch 200 may receive the ARP response message which is a response to the ARP request packet from the second terminal, and transmit it to the first terminal 11 ⑤.

The first terminal 11 may perform mutual communication with the second terminal 12 using the MAC address of the second terminal 12 included in the ARP response message transmitted through the switch 200.

Accordingly, referring to FIGS. 1 and 2, the controller 100 may receive the ARP request packet from the switch 200 (or a network device) so that the first terminal 11 communicates with the second terminal 12. Further, the controller 100 may transmit the flow table information and the process command message for the process operation of the ARP request packet to the switch 200, and control the switch 200 to perform the process command message according to the flow table updated based on the flow table information.

Moreover, the switch 200 may receive the ARP request packet from the first terminal 11 so that the first terminal 11 communicates with the second terminal 12, transmit the ARP request packet to the controller 100, and receive the flow table information and the process command message for performing the process operation of the ARP request packet as a response to the ARP request packet.

Figure 3:
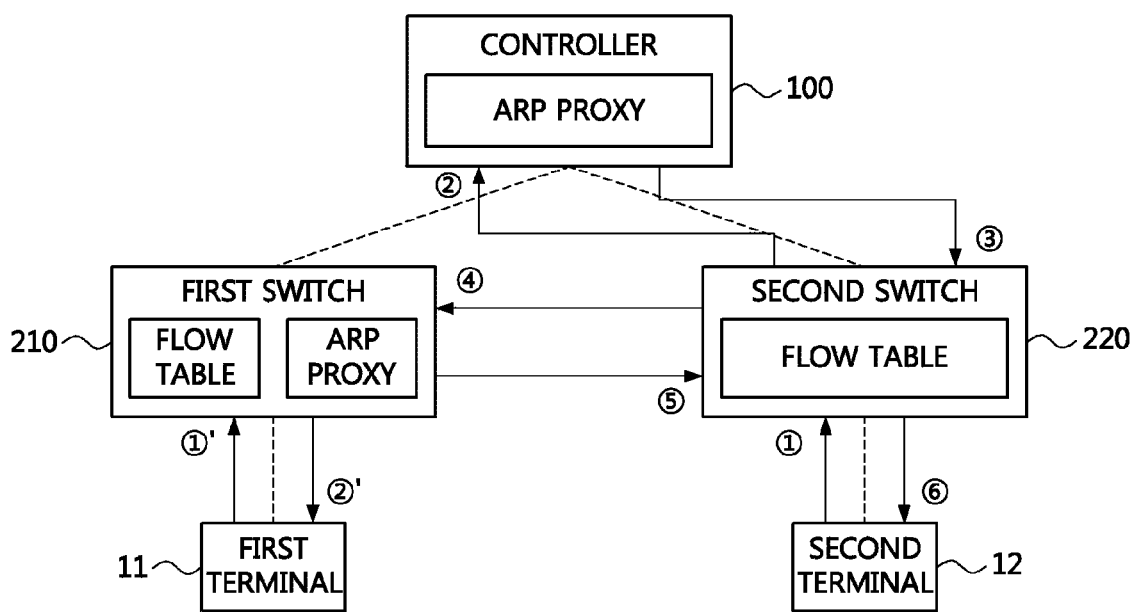
FIG. 3 is a diagram for describing a method in which a switch performs the ARP proxy function in the SDN environment according to one embodiment of the inventive concept.

FIG. 3 is a diagram for describing a method in which a switch performs the ARP proxy function in the SDN environment according to one embodiment of the inventive concept.

An example in which a controller 100 capable of performing the ARP proxy function controls a first switch 210 which performs the ARP proxy function and a second switch 220 which does not perform the ARP proxy function will be described with reference to FIG. 3. Here, the first switch 210 may include a function block performing the ARP proxy function, the function block performing the ARP proxy function may be implemented as a separate module, or by providing an additional function to a module included in the first switch 210.

Further, a first terminal 11 may be connected to a lower layer of the first switch 210, and a second terminal 12 may be connected to a lower layer of the second switch 220.

First, a method in which the first terminal 11 finds a MAC address of the second terminal 12 will be described.

The first terminal 11 may broadcast an ARP request packet in order to find the MAC address of the second terminal 12 ①'. The first switch 210 may know the MAC address of the second terminal 12 connected to the lower layer of the second switch 220 which is adjacent to the first switch 210 since the first switch 210 performs the ARP proxy function.

Accordingly, the first switch 210 may transmit an ARP response message including the MAC address information of the second terminal 12 to the first terminal 11 as a response to the ARP request packet ②', and the first terminal 11 may perform mutual communication with the second terminal 12 using the MAC address of the second terminal 12 included in the ARP response message transmitted from the first switch 210.

Next, a method in which the second terminal 12 finds the MAC address of the first terminal 11 will be described.

The second terminal 12 may broadcast the ARP request packet in order to find the MAC address of the first terminal 11 ①. The second switch 220 receiving the ARP request packet may transmit a message for the ARP request packet to the controller 100 since the second switch 220 does not perform the ARP proxy function ②. Here, the message which the second switch 220 transmits to the controller 100 may have a packet-in type according to an interaction protocol between the controller 100 and the second switch 220. For example, a packet-in type message transmission method only may transmit a message header including a message ID to the controller 100 when there is a memory space available in the second switch 220, and transmit the entire ARP request packet together with the packet-in type message to the controller 100 when there is no memory space available in the second switch 220.

The controller 100 may transmit flow table information and a process command message for a process operation of the ARP request packet to the second switch 220 ③. For example, the controller 100 may transmit the flow table information for setting a routing path for the ARP request and response in advance to the second switch 220, and then transmit a process command message defining the process operation for the ARP request packet to the second switch 220. Here, the message in which the controller 100 transmits to the second switch 220 may have a packet-out type according to the interaction protocol between the controller 100 and the second switch 220. Accordingly, the second switch 220 may confirm the process operation by mapping the original packet-in type message with reference to the packet-out type message transmitted from the controller 100.

The second switch 220 may generate or update a flow table using the flow table information transmitted from the controller 100, and then synchronize a time for processing a routing of the ARP request packet, and for this, a barrier command which is a protocol between the controller 100 and the second switch 220 may be used for sequentially processing commands between the controller 100 and the second switch 220.

The controller 100 may transmit a process command message including the ARP response message to the second switch. That is, the controller 100 may transmit an ARP response message including the MAC address of the first terminal 11 to the second switch 220 as a response to the ARP request packet since the controller 100 performs the ARP proxy function.

Accordingly, the second switch 220 may transmit the ARP response message transmitted from the controller 100 to the second terminal 12 ⑥, and the second terminal 12 may perform mutual communication with the first terminal 11 using the MAC address of the first terminal 11 included in the ARP response message transmitted from the second switch 220.

Further, the process command message which the controller 100 transmits to the second switch 220 may not include the ARP response message. That is, the controller 100 may not generate the ARP response message including the MAC address of the first terminal 11 since the first switch 210 to which the first terminal 11 is connected performs the ARP proxy function.

In this case, the second switch 220 may transmit the ARP request packet to the first switch 210 according to the process command message and the updated flow table transmitted from the controller 100. The first switch 210 may know the MAC address of the first terminal 11 which is adjacent to the first switch 210 since the first switch 210 performs the ARP proxy function. The first switch 210 may transmit the ARP response message including the MAC address information of the first terminal 11 to the second switch 220 as a response to the ARP request packet ⑤, and the second switch 220 may transmit the ARP response message to the second terminal 12 ⑥.

Accordingly, the second terminal 12 may perform mutual communication with the first terminal 11 using the MAC address of the first terminal 11 included in the ARP response message transmitted from the second switch 220.

Figure 4:
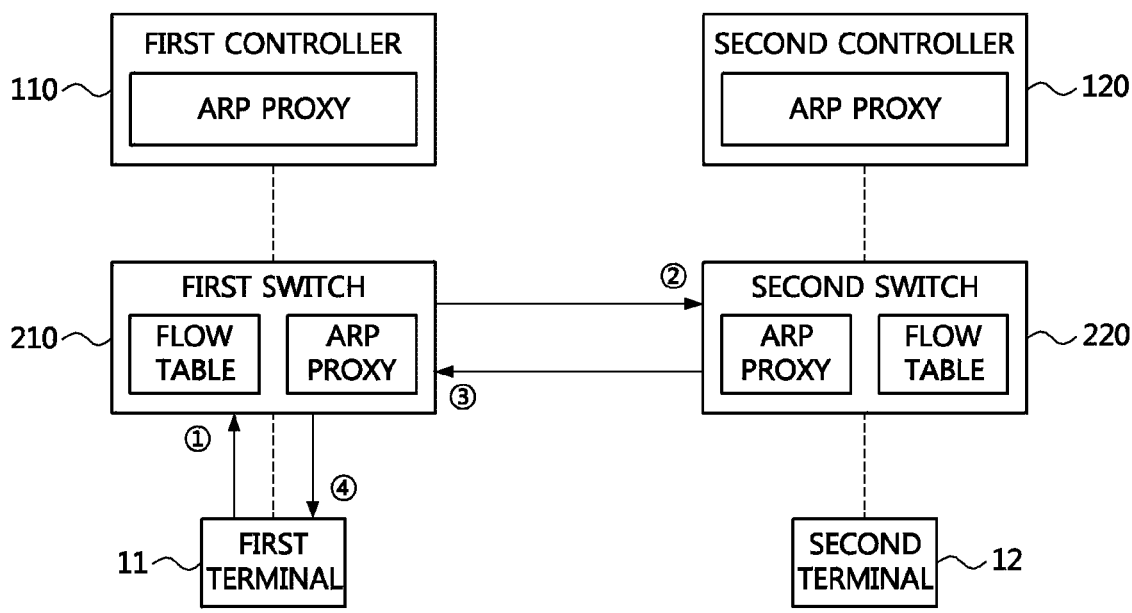
FIG. 4 is a diagram for describing a method in which a switch performs the ARP proxy function in the SDN environment according to another embodiment of the inventive concept.

FIG. 4 is a diagram for describing a method in which a switch performs an ARP proxy function in an SDN environment according to another embodiment of the inventive concept.

Referring to FIG. 4, a first controller 110 may control a first switch 210, and a second controller 120 may control a second switch 220. The first switch 210 and the second switch 220 may perform the ARP proxy function. Here, each of the first switch 210 and the second switch 220 may include a function block performing the ARP proxy function, the function block performing the ARP proxy function may be implemented as a separate module, or by providing an additional function to a module included in each of the first switch 210 and the second switch 220.

Further, the first terminal 11 may be connected to a lower layer of the first switch 210, and the second terminal 12 may be connected to a lower layer of the second switch 220.

A method in which the first terminal 11 finds a MAC address of the second terminal 12 will be described with reference to FIG. 4.

The first terminal 11 may broadcast an ARP request packet in order to find the MAC address of the second terminal 12 ①. The first switch 210 may know the MAC address of the second terminal 12 connected to the lower layer of the second switch 220 which is adjacent to the first switch 210 since the first switch 210 performs the ARP proxy function. Accordingly, the first switch 210 may transmit an ARP response message including the MAC address information of the second terminal 12 to the first terminal 11 as a response to the ARP request packet.

However, since the second terminal 12 is connected to the lower layer of the second switch 220 capable of performing the ARP proxy function and the second switch 220 is in a domain different from the first switch 210, the first switch 210 may not manage the MAC address of the second terminal 12. In this case, the first switch 210 may transmit the ARP request packet to the second switch which is in the different domain ②.

The second switch 220 may transmit the ARP response message including the MAC address of the second terminal 12 to the first switch 210 as a response to the ARP request packet ③.

The first switch 210 may transmit the ARP response message transmitted from the second switch 220 to the first terminal 11, and the first terminal may perform mutual communication with the second terminal 12 using the MAC address of the second terminal 12 included in the ARP response message transmitted from the first switch 210.

Accordingly, referring to FIGS. 3 and 4, the first switch 210 may receive the ARP request packet from the first terminal 11 so that the first terminal 11 communicates with the second terminal 12, and transmit the ARP response message including the MAC address information of the second terminal 12 to the first terminal 11 as a response to the ARP request packet.

For example, when the second terminal 12 is connected to the first switch 210 and the first switch 210 has the APR proxy function, the first switch 210 may perform the ARP proxy function by including the MAC address information of the second terminal 12 in the ARP response message.

Further, when the second terminal 12 is connected to the second switch 220 located in a domain different from the first switch 210 and the second switch 220 has the ARP proxy function, the first switch 210 may perform the ARP proxy function by including the MAC address information of the second terminal 12 in the ARP response message.

Moreover, when the second terminal 12 is connected to the second switch 220 located in a domain different from the first switch 210 and the second switch 220 has the ARP proxy function, the first switch 210 may transmit the ARP request packet to the second switch 220, the second switch 220 may transmit the ARP request message including the MAC address information of the second terminal 12 to the first switch 210 as a response to the ARP request packet. Accordingly, the first switch 210 may transmit the ARP response message to the first terminal 11.

Figure 5:
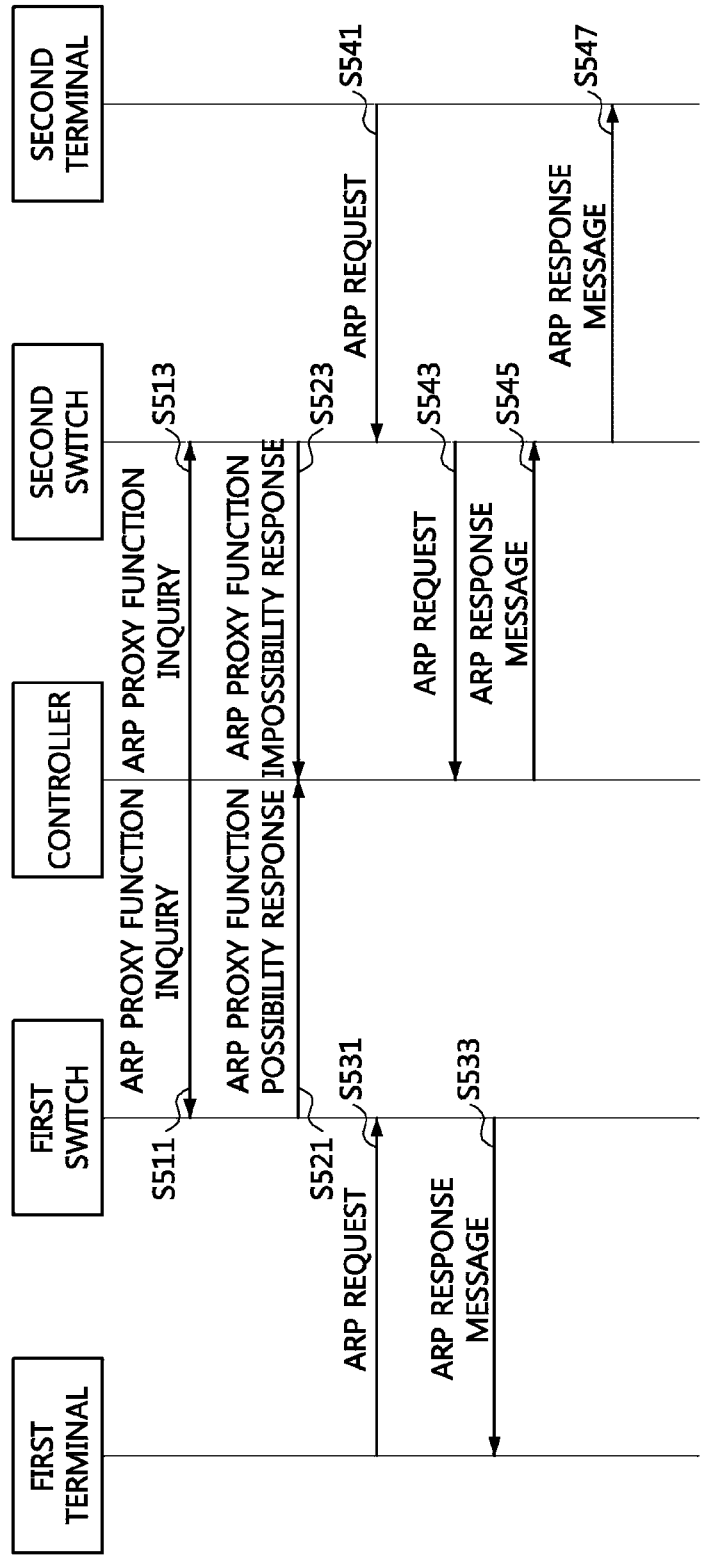
FIG. 5 is a flowchart for describing a method of processing an ARP through an interaction between the controller and the switch in the SDN environment according to an embodiment of the inventive concept.

FIG. 5 is a flowchart for describing a method of processing an ARP through an interaction between a controller and a switch in an SDN environment according to an embodiment of the inventive concept.

Referring to FIG. 5, the controller may inquire whether a plurality of switches have ability to perform an ARP proxy function to the plurality of switches. For example, the controller may inquire whether the first switch and second switch have the ARP proxy function to the first switch and the second switch (S511, S513).

Each of the plurality of switches may confirm whether the switch is able to perform the ARP proxy function for itself, and respond to the inquiry of the controller. For example, the first switch may make a response that it is able to perform the ARP proxy function (S521), and the second switch may make a response that it is unable to perform the ARP proxy function (S523). Accordingly, the controller may identify or select a switch capable of performing the ARP proxy function among the plurality of switches in which the controller controls. That is, in FIG. 5, the first switch may have the ARP proxy function and the second switch may not have the ARP proxy function.

First, the first switch may receive an ARP request packet from the first terminal so that the first terminal communicates with the second terminal, transmit an ARP response message including MAC address information of the second terminal to the first terminal, and thus perform the ARP proxy function.

In more detail, when the first terminal connected to a lower layer of the first switch capable of performing the ARP proxy function makes the ARP request (S531), the first switch may directly transmit the ARP response message including MAC address of the second terminal to the first terminal since the first switch performs the ARP proxy function (S533). Accordingly, the first terminal may perform mutual communication with the second terminal using the MAC address of the second terminal included in the ARP response message transmitted from the first switch.

Next, the second switch may receive the ARP request packet from the second terminal so that the second terminal communicates with the first terminal, transmit the ARP request packet to the controller, receive the ARP response message which is a response to the ARP request packet from the controller, and transmit the ARP response message to the second terminal.

In more detail, when the second terminal connected to a lower layer of the second switch not capable of performing the ARP proxy function makes the ARP request (S541), the second switch may transmit the ARP request to the controller since the second switch does not perform the ARP proxy function (S543). The controller receiving the ARP request from the second switch may transmit the ARP response message including the MAC address of the first terminal to the second switch since the controller basically performs the ARP proxy function (S545). Accordingly, the second terminal may receive the ARP response message from the second switch (S547), and perform mutual communication with the first terminal using the MAC address of the first terminal included in the ARP response message.

The method of processing the ARP according to an embodiment of the inventive concept may be implemented as a computer readable program or a code in a computer readable recording medium. The computer readable recording medium may include all kinds of recording devices in which computer readable data is stored. Further, the computer readable recording medium may also be distributed over network coupled computer systems so that the computer readable program or code is stored and executed in a distributive manner.

Figure 6:
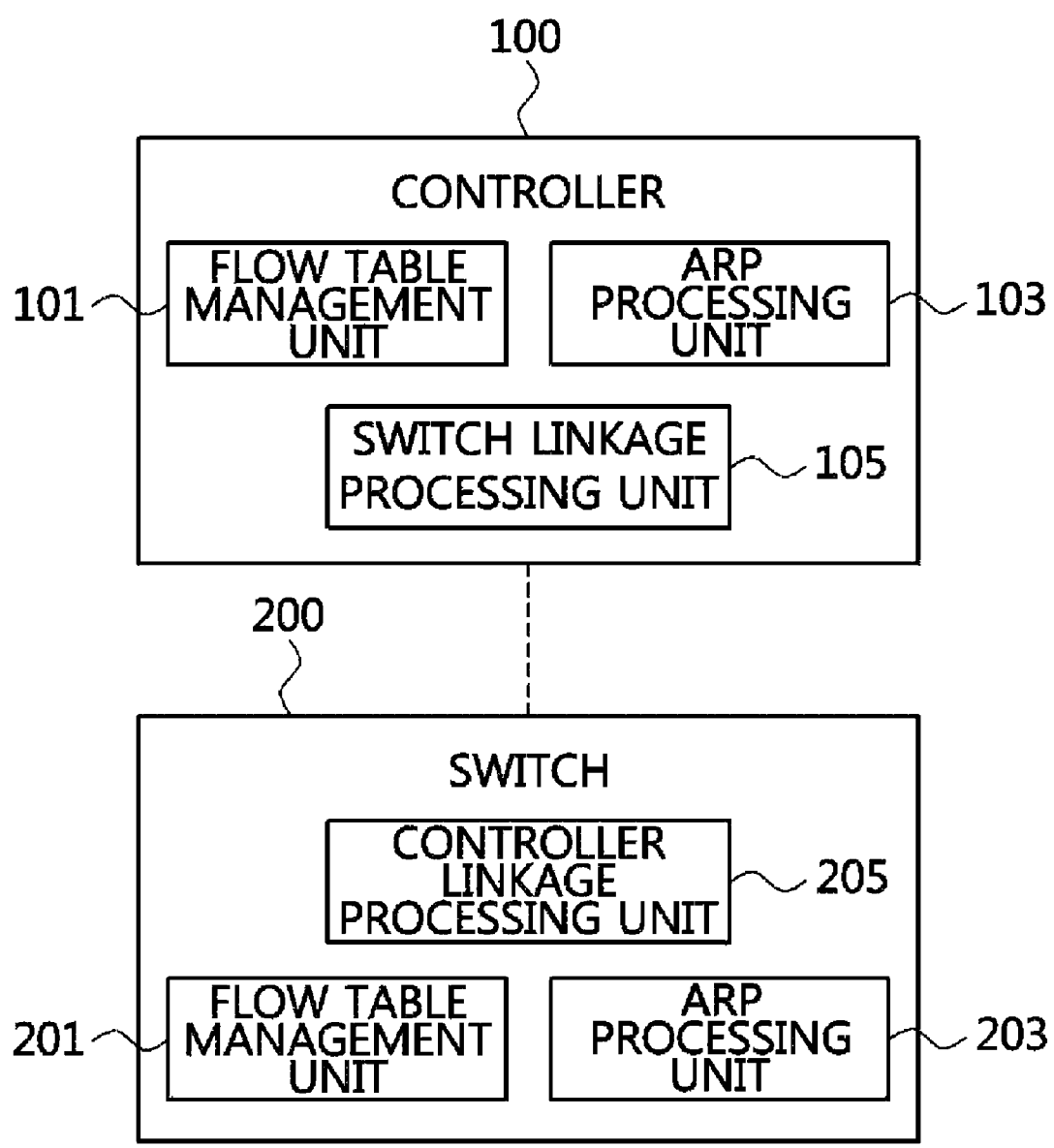
FIG. 6 is a block diagram illustrating the controller and the switch which perform an ARP process function according to an embodiment of the inventive concept.

FIG. 6 is a block diagram illustrating a controller and a switch which perform an ARP process function according to an embodiment of the inventive concept.

Referring to FIG. 6, the method of processing the ARP according to an embodiment of the inventive concept may be performed by an interaction between the controller 100 and the switch 200.

First, the controller 100 may include a flow table management unit 101, an ARP processing unit 103, and a switch linkage processing unit 105.

The flow table management unit 101 may store and manage a flow table for managing a plurality of switches which the controller 100 controls.

The ARP processing unit 103 may be a function block performing the ARP proxy function, and implemented as a separate module or by providing an additional function to a module included in the controller 100.

The switch linkage processing unit 105 may control a protocol in order to communicate with the plurality of switches.

Next, the switch 200 may include a flow table management unit 201, an ARP processing unit 203, and a controller linkage processing unit 207.

The flow table management unit 201 may store and manage a flow table of the switch 200.

The ARP processing unit 203 may be a function block performing the ARP proxy function, and implemented as a separate module or by providing an additional function to a module included in the switch 200.

The controller linkage processing unit 207 may control a protocol in order to communicate with the controller 100.

Accordingly, the method of processing the ARP according to an embodiment of the inventive concept may be performed by the interaction between the controller 100 and the switch 200 shown in FIG. 6.

Figure 7:
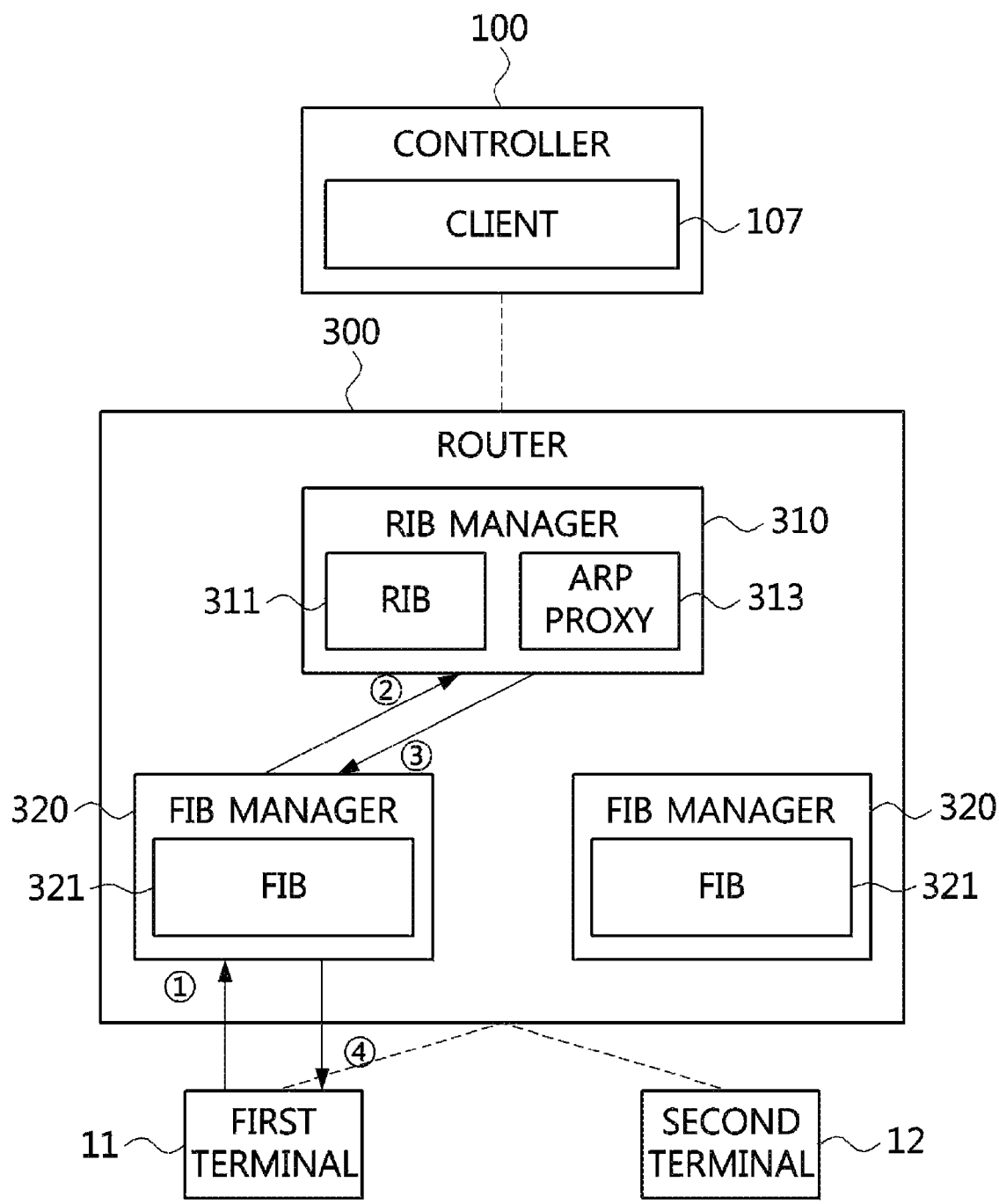
FIG. 7 is a diagram for describing a method in which a switch performs an ARP proxy function according to still another embodiment of the inventive concept.

FIG. 7 is a diagram for describing a method in which the switch performs the ARP proxy function according to an embodiment of the inventive concept.

Referring to FIG. 7, a routing system performing the ARP process function according to an embodiment of the inventive concept may be configured so that the controller 100 controls a router 300.

In detail, the router 300 may be controlled by the controller 100 which is separated physically.

The router 300 may include a routing information base (RIB) manager 310 and forwarding information base (FIB) managers 320. In more detail, the RIB manager 310 may include an RIB module 311 and an ARP proxy 313, and the each FIB manager 320 may include an FIB module 321.

The RIB manager 310 may perform a control for routing, and each FIB manager 320 may perform a function of each line card corresponding to a data plane. For example, the ARP request received from each line card may be managed by the RIB manager 310, and for this function, the RIB manager 310 may include the ARP proxy 313.

The controller 100 may include various network applications through a Northbound application program interface (API) provided by the controller 100.

Further, a client module 107 of the controller 100 may perform mutual communication with the router 300 through an interface to routing system (I2RS) which is a standardized routing system interface.

The method of processing the ARP performed in the routing system shown in FIG. 7 will be described below.

The first terminal 11 may broadcast an ARP request packet in order to find a MAC address of the second terminal 12 ①.

The FIB manager 320 of the router 300 may transmit the ARP request packet to the RIB manager 310 in order to obtain MAC address information of the second terminal 12 ②.

Since the RIB manager 310 of the router 300 performs the ARP proxy function, the ARP proxy 313 may generate an ARP response message including the MAC address of the second terminal 12 and transmit it to the FIB manager 320 ③. That is, the ARP proxy 313 of the RIB manager 310 may have the IP information and the MAC address of the second terminal 12 in advance.

The FIB manager 320 of the router 300 may transmit the ARP response message to the first terminal 11 ④, and the first terminal 11 may perform mutual communication with the second terminal 12 using the MAC address of the second terminal 12 included in the ARP response message transmitted from the FIB manager 320.

An example in which the controller 100, the switch 200, and the router 300 according to an embodiment of the inventive concept is configured to be separated from each other is illustrated for convenience of explanation, but at least two elements in each configuration may be implemented as a single element or one element in each configuration may be implemented by dividing into a plurality of elements, and an example in which the elements in each configuration are integrated or separated may be included in the scope of the invention without departing from the spirit of the invention. Further, each configuration may be configured as one processor or a plurality of processors, and each processor may perform a function corresponding to a microprocessor, a central processing unit (CPU), or a means similar to them.

The method of processing the ARP according to an embodiment of the inventive concept can reduce a load of the controller by sharing and processing the ARP proxy function with the network device in the SDN environment.

Further, the terminal connected to the network device can effectively communicate with a terminal included in another network by simplifying the ARP process through the controller and the network device in the SDN environment.

Moreover, an optimal ARP process can be performed in various network environments by considering functions of network elements in the SDN environment and adaptively performing the ARP process.

While the example embodiments of the inventive concept and their advantages have been described in detail, it should be understood that various changes, substitutions, and alterations may be made herein without departing from the scope of the invention.

What is claimed is:

1. A method of processing an address resolution protocol (ARP) in a software-defined networking (SDN) environment, performed by a controller having an ARP proxy function, the method comprising:
   determining, by the controller, whether a network device is capable of performing an ARP proxy function; and
   in response to determining that the network device is not capable of performing the ARP proxy function:
      receiving an ARP request packet from a network device so that a first terminal communicates with a second terminal; and
      transmitting flow table information and a process command message for processing an ARP request packet to the network device, and controlling the network device to perform the process command message according to a flow table updated based on the flow table information.

2. The method of processing the ARP of claim 1, wherein the controlling of the network device to perform the process command message comprises controlling the network device to transmit an ARP response message to the first terminal according to the process command message.

3. The method of processing the ARP of claim 2, wherein the ARP response message includes media access control (MAC) address information of the second terminal by the controller.

4. A method of processing an address resolution protocol (ARP) by a network device in a software-defined networking (SDN) environment, the method comprising:
   determining, by a controller, whether a first network device is capable of performing an ARP proxy function;
   in response to determining that the first network device is capable of performing the ARP proxy function:
      receiving, by a first network device, an ARP request packet from a first terminal so that the first terminal communicates with a second terminal; and
      transmitting, directly from the first network device to the first terminal, an ARP response message including MAC address information of the second terminal to the first terminal as a response to the ARP request packet,
   wherein when the second terminal is connected to the first network device and the first network device is capable of performing the ARP proxy function, the transmitting of the ARP response message to the first terminal comprises performing the ARP proxy function by including, by the first network device, the MAC address information of the second terminal in the ARP response message.

5. The method of processing the ARP of claim 4, wherein, when the second terminal is connected to a second network device located in a domain different from the first network device and the second network device is capable of performing an ARP proxy function, the transmitting of the ARP response message to the first terminal comprises performing the ARP proxy function by including, by the first network device, the MAC address information of the second terminal in the ARP response message.

6. The method of processing the ARP of claim 4, wherein, when the second terminal is connected to a second network device located in a domain different from the first network device and the second network device is capable of performing an ARP proxy function, the transmitting of the ARP response message to the first terminal includes:
   transmitting, by the first network device, the ARP request packet to the second network device;
   transmitting, by the second network device, an ARP response message including MAC address information of the second terminal to the first network device as a response to the ARP request packet; and
   transmitting, by the first network device, the ARP response message to the first terminal.

7. The method of processing the ARP of claim 4, wherein the transmitting of the ARP response message to the first terminal includes:
   transmitting the ARP request packet to the controller; and
   receiving flow table information and a process command message for a process operation of the ARP request packet from the controller as a response to the ARP request packet.

8. The method of processing the ARP of claim 7, wherein the transmitting of the ARP response message to the first terminal further includes:
   updating a flow table based on the flow table information.

9. The method of processing the ARP of claim 8, wherein the transmitting of the ARP response message to the first terminal further includes:
   transmitting an ARP response message to the first terminal according to the updated flow table and the process command message.

10. The method of processing the ARP of claim 9, wherein the ARP response message includes the MAC address information of the second terminal by the controller.

11. The method of processing the ARP of claim 8, wherein the transmitting of the ARP response message to the first terminal further includes:
broadcasting the ARP request packet to a plurality of terminals according to the updated flow table and the process command message; and
receiving an ARP response message which is a response to the ARP request packet from the second terminal, and transmitting the ARP response message to the first terminal.

12. The method of processing the ARP of claim 11, wherein the ARP response message includes the MAC address information of the second terminal by the second terminal.

13. A method of processing an address resolution protocol (ARP) in a software-defined networking (SDN) environment, comprising:
inquiring, by a controller, whether a plurality of network devices have an ability to perform an ARP proxy function;
receiving, by the controller, a response from each of the plurality of network devices whether the plurality of network devices have the ability to perform the ARP proxy function; and
selecting, by the controller, the network device to perform the ARP proxy function based on a response of each of the plurality of network devices.

14. The method of processing the ARP of claim 13, wherein the network device which is selected to perform the ARP proxy function receives an ARP request packet from a first terminal so that the first terminal communicates with a second terminal, transmits an ARP message including MAC address information of the second terminal to the first terminal, and performs the ARP proxy function.

15. The method of processing the ARP of claim 13, wherein the network device which is not selected to perform the ARP proxy function receives an ARP request packet from a first terminal so that the first terminal communicates with a second terminal, transmits the ARP request packet to the controller, receives an ARP response message which is a response to the ARP request packet from the controller, and transmits the ARP response message to the first terminal.

16. The method of processing the ARP of claim 15, wherein the ARP response message includes MAC address information of the second terminal by the controller.

* * * * *